(12) United States Patent
Botti et al.

(10) Patent No.: US 6,655,325 B1
(45) Date of Patent: Dec. 2, 2003

(54) POWER GENERATION SYSTEM AND METHOD WITH EXHAUST SIDE SOLID OXIDE FUEL CELL

(75) Inventors: Jean Joseph Botti, Rochester Hills, MI (US); Malcom James Grieve, Fairport, NY (US); Carl Elmer Miller, Millington, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/241,239

(22) Filed: Feb. 1, 1999

(51) Int. Cl.⁷ .................. F02B 43/08; H01M 8/10
(52) U.S. Cl. .................. 123/3; 60/649; 429/30
(58) Field of Search .............. 123/2, 3; 429/12, 429/17, 20, 21, 26, 29, 38, 39; 60/649, 734, 737

(56) References Cited

U.S. PATENT DOCUMENTS

| | | | |
|---|---|---|---|
| 4,522,894 A | * 6/1985 | Hwang et al. ............ | 429/19 |
| 4,597,170 A | 7/1986 | Isenberg ............ | 29/623.5 |
| 4,728,584 A | 3/1988 | Isenberg ............ | 429/31 |
| 4,729,931 A | 3/1988 | Grimble ............ | 429/17 |
| 5,047,299 A | 9/1991 | Shockling ............ | 429/20 |
| 5,413,879 A | * 5/1995 | Domeracki et al. ....... | 429/30 |
| 5,541,014 A | * 7/1996 | Micheli et al. ............ | 429/19 |
| 5,968,680 A | * 10/1999 | Wolfe et al. ............ | 429/20 |
| 6,155,212 A | * 12/2000 | McAlister ............ | 123/3 |
| 6,213,234 B1 | * 4/2001 | Rosen et al. ............ | 429/13 |
| 6,311,650 B1 | * 11/2001 | Lamm ............ | 123/3 |
| 6,348,278 B1 | * 2/2002 | LaPierre et al. ............ | 429/19 |
| 6,502,533 B1 | * 1/2003 | Meacham ............ | 123/3 |

\* cited by examiner

Primary Examiner—Thomas Denion
Assistant Examiner—Thai-Ba Trieu
(74) Attorney, Agent, or Firm—Jimmy L. Funke

(57) ABSTRACT

The present system and method relate to power generation utilizing an exhaust side solid oxide fuel cell. Fuel is burned in an engine in the presence of air. The engine exhaust passes through a solid oxide fuel cell where it is consumed in the production of electricity and ionization of oxygen in an air stream also introduced to the solid oxide fuel cell. The solid oxide fuel cell effluent fuel stream and/or air stream can be recycled through the engine, directed through a turbine to recover additional energy therefrom, and/or passed through a catalytic converter. The resulting system exhaust has negligible to zero amounts of nitric oxides, hydrocarbons, carbon monoxide, and particulates.

25 Claims, 1 Drawing Sheet

POWER GENERATION SYSTEM AND METHOD WITH EXHAUST SIDE SOLID OXIDE FUEL CELL

TECHNICAL FIELD

The present invention relates to a power generation system and method, and especially relates to a power generation system and method which employ a solid oxide fuel cell on the exhaust side of the engine.

BACKGROUND OF THE INVENTION

Alternative transportation fuels have been represented as enablers to reduce toxic emissions in comparison to those generated by conventional fuels. At the same time, tighter emission standards and significant innovation in catalyst formulations and engine controls has led to dramatic improvements in the low emission performance and robustness of gasoline and diesel engine systems. This has certainly reduced the environmental differential between optimized conventional and alternative fuel vehicle systems. However, many technical challenges remain to make the conventionally-fueled internal combustion engine a nearly zero emission system having the efficiency necessary to make the vehicle commercially viable.

Alternative fuels cover a wide spectrum of potential environmental benefits, ranging from incremental toxic and $CO_2$ emission improvements (reformulated gasoline, alcohols, LPG etc.) and to significant toxic and $CO_2$ emission improvements (natural gas, DME etc.). Hydrogen is clearly the ultimate environmental fuel, with potential as a nearly emission free internal combustion engine fuel (including $CO_2$ if it comes from a non-fossil source). Unfortunately, the market-based economics of alternative fuels or new power train systems are uncertain in the short to mid-term.

The automotive industry has made very significant progress in reducing automotive emissions for both the mandated test procedures and the "real world". This has resulted in some added cost and complexity of engine management systems, yet those costs are offset by other advantages of computer controls: increased power density, fuel efficiency, drivability, reliability and real-time diagnostics.

Future initiatives to require zero emission vehicles appear to be taking us into a new regulatory paradigm where asymptotically smaller environmental benefits come at a very large incremental cost. Yet, even an "ultra low emission" certified vehicle can emit high emissions in limited extreme ambient and operating conditions or with failed or degraded components.

What is needed in the art is a power generation system having essentially zero emissions, high efficiency, and compatibility with existing fuels and infrastructure.

SUMMARY OF THE INVENTION

The present invention relates to a power generation method and system. The system comprises: an engine, having an intake and an exhaust; an air supply in fluid communication with said engine intake; a fuel supply in fluid communication with said engine intake; and at least one SOFC, having an air intake in fluid communication with said air supply, a fuel side intake, a SOFC effluent and an air effluent, said SOFC fuel side intake in fluid communication with said engine exhaust.

The method comprises: supplying at least a first portion of fuel and a first portion of air to an engine; reacting said first portion of fuel and said first portion of air in an engine to produce an engine effluent; introducing said engine effluent to a fuel intake of a SOFC; introducing a second portion of air to an air intake of said SOFC; and ionizing oxygen in the second portion of air such that the ionized oxygen migrates to the fuel side of the SOFC where it reacts with said engine effluent to produce an SOFC effluent.

These and other features and advantages of the present invention will be apparent from the following brief description of the drawings, detailed description, and appended claims and drawings.

BRIEF DESCRIPTION OF THE DRAWINGS

Referring now to the drawing, which is meant to be exemplary, not limiting, and where mass flows are shown with solid lines and power flows are illustrated with broken lines:

The FIGURE is a schematic depiction of another embodiment of a system of the present invention utilizing a SOFC on the exhaust side of an engine.

DETAILED DESCRIPTION OF THE INVENTION

Figure 1:
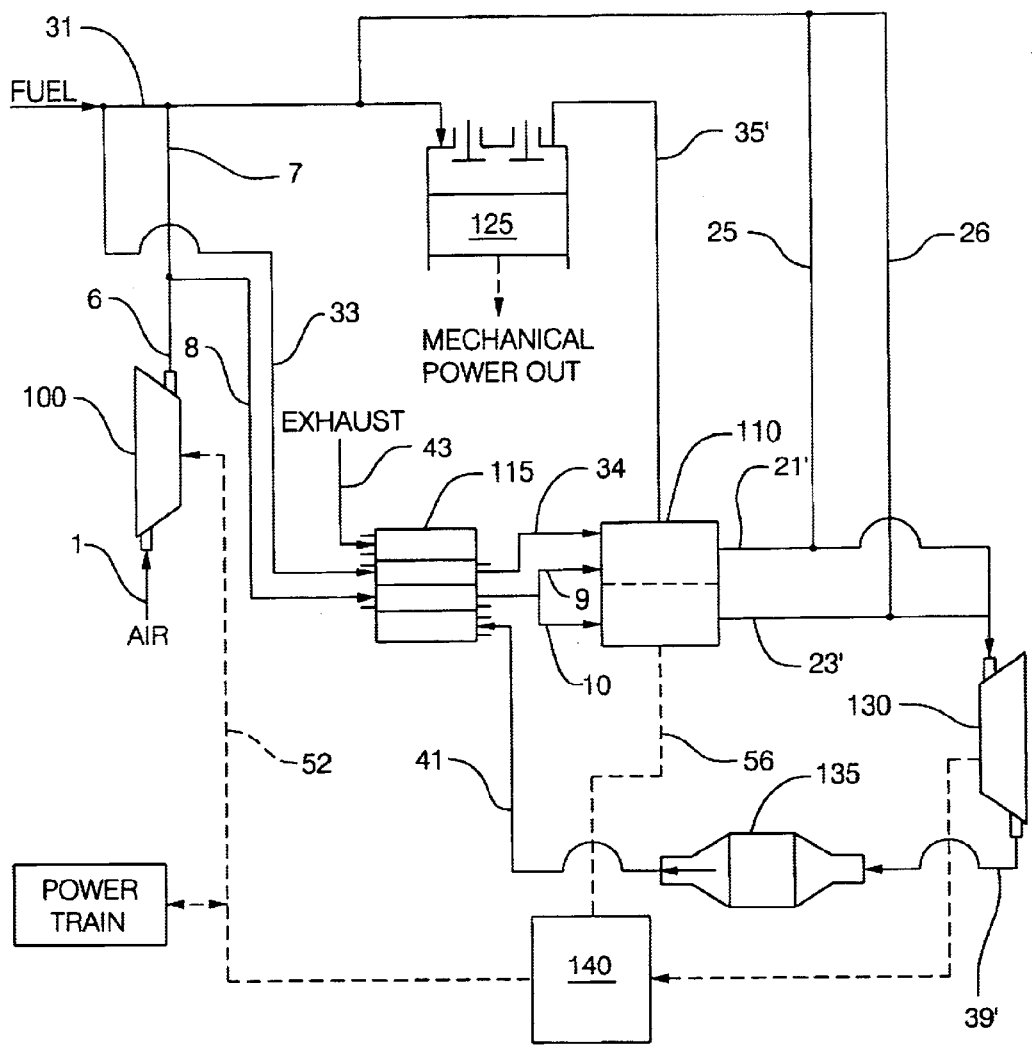

The present invention relates to a power generation system and methods for using the same. Generally, the system may comprise at least one solid oxide fuel cell ("SOFC"), an engine, one or more heat exchangers, and optionally, one or more compressors, an exhaust turbine, a catalytic converter, preheating device, plasmatron, electrical source, and conventional connections, wiring, control valves, and a multiplicity of electrical loads, including, but not limited to, lights, resistive heaters, blowers, air conditioning compressors, starter motors, traction motors, computer systems, radio/stereo systems, and a multiplicity of sensors and actuators etc.

In one embodiment of the present invention disclosed in the FIGURE, the SOFC is employed on the exhaust side of an engine. The system is intended to be capable of operating in two modes described herein as "normal" and "standby". In the standby mode, the SOFC is operated independently of the engine at relatively low power levels. In the normal mode, at least a portion of the fuel 31 and at least a portion of the air 1 enter an engine 125, with the air optionally first compressed in compressor 100 to pressures up to or exceeding about 3 atmospheres (absolute pressure), with about 1.5 to about 2.0 atmospheres preferred. Within the engine, the fuel is burned in the presence of air. Under most operating conditions, the engine is operated between stoichiometric and the rich limit, producing an engine effluent comprising nitrogen, carbon dioxide, oxygen and water, in combined amounts of up to or exceeding about 99 volume percent (vol. %), with between about 91 vol. % and about 99.4 vol. % common, and lesser amounts possible, and small amounts of carbon monoxide (typically about 0.5 vol. % to about 5 vol. %), hydrogen (about 0.1 vol. % to about 3 vol. %), and hydrocarbons, which includes unburned fuel and by-products, (up to about 0.5 vol. %), with greater amounts of these constituents possible if desired.

From the engine, the engine effluent 35' is directed into the fuel side of a SOFC. In star-up modes or under conditions where heat must be added to the SOFC, air 9 may also be injected to the engine effluent 35' or the engine may be run lean. Under conditions where additional fuel is desired for the SOFC, extra fuel may be injected late in the combustion process, into the engine affluent 35', or may be vaporized or atomized in the heat exchanger 115 and supplied directly as fuel 34 to the fuel side of the SOFC. Meanwhile, the remainder of the air stream 10 is directed to the air side of the SOFC where oxygen in the air ionizes to $O^{-2}$, producing electricity. The electricity is directed from the SOFC 110 via line 56 to as electrical source 140 such as a battery, capacitor, motor/generator, combination thereof, and or other device, while the oxygen ions migrate across the ceramic electrolyte to the fuel side where they react with the fuel and engine effluent to form mostly water and carbon dioxide.

The SOFC effluent 21' and/or the oxygen depleted air 23' can optionally pass through a turbine 130 which recovers:energy from the stream(s). The SOFC effluent 21' and oxygen depleted air 23' then preferably passing through a catalytic converter 135 prior to catering the heat exchange 115. Within the heat exchanger 115, the SOFC effluent 21' and oxygen depleted air 23' are cooled, typically to temperatures below about 300° C. while heating the fuel 31 and air 1 to temperatures typically exceeding about 300° C. The exhaust stream 43 from the heat exchanger 115 can then be vented to the environment.

Alternatively, for cold start-up and warn up conditions, the SOFC preferably performs a reforming function where all or a portion of the SOFC effluent 21' and/or oxygen depleted air 23' can be combined with the fuel stream 31 as it enters the engine 125. Introducing SOFC effluent 21' and/or oxygen depleted air 23' to the engine intake helps improve the efficiency of the ultra-dilute combustion within the engine, thereby reducing engine emissions, especially hydrocarbons and nitric oxides. Under conditions where all or part of the SOFC is maintained at an elevated temperature, this intake reforming function is particularly effective. This function is further defined in commonly assigned U.S. Pat. No. 6,230,494, which is hereby incorporated by reference.

As stated above, the air entering the system is preferably compressed prior to introduction into the SOFC 110, however, the compressor is not essential since the engine itself can act as a pump, enabling elimination of the compressor. The compressor, however, allows increased power output and reformate, i.e. engine effluent 35', output of the engine. The particular type of compressor employed in the system Is dependent upon the particular application. For example, a conventional compressor capable of compressing to moderate pressures (up to about 3 atmospheres) is typically employed in turbocharged engines, with the pressure employed controlled to optimize the power output and efficiency of the SOFC and the engine as a system. For uses within a vehicle, the pressure can be up to or exceeding about 2 atmospheres (absolute pressure), with about 1 to about 2 atmospheres (absolute pressure) preferred. Possible compressors include, but are not limited to, mechanical devices driven, for example, by direct connection to the exhaust turbine or by a mechanical supercharger, or can be operated independently via electricity or hydraulics.

The SOFC employed with the present invention can be any conventional SOFC capable of ionizing oxygen. The SOFC comprises an electrolyte having catalyst disposed on both the fuel and air side of the electrolyte. Possible catalysts include those capable of ionizing oxygen and reacting the ionized oxygen with conventional fuels, including, but not limited to, noble metal-based catalysts and alloys thereof, among others. It is envisioned that multiple SOFCs can be employed, in series or in parallel on the exhaust side of the engine, or even on the induction side of the engine.

Within the SOFC, the ionization of the oxygen produces electricity which can be directly utilized by the vehicle to power various electrical parts, including, but not limited to, lights, resistive heaters, blowers, air conditioning compressors, starter motors, traction motors, computer systems, radio/stereo systems, and a multiplicity of sensors and actuators, among others. Unlike conventional motor vehicles, the electricity produced by the SOFC is direct current which can be matched to the normal system voltage of the vehicle, thereby avoiding the requirements for devices such as diodes, voltage conversion and other losses, such as resistive losses in the wiring and in/out of the battery, associated with conventional vehicle systems and traditional hybrid electrical systems. This high efficiency electricity allows efficient electrification of the vehicle, including functions such as air conditioning and others, allowing weight, fuel economy and performance advantages compared to conventional hybrid electric mechanization and conventional internal combustion engine systems.

During start-up and for cabin heating, the SOFC can be operated at high adiabatic temperatures, e.g. up to about 1,000° C., subject to catalyst limitations, with typical operating temperatures ranging from about 600° C. to about 900° C., and preferably about 650° C. to about 800° C. Consequently, at least one heat exchanger is preferably employed to cool the SOFC effluent and conversely heat the air prior to entering the SOFC, with conventional heat exchangers generally employed.

The fuel utilized in the system is typically chosen based upon the application, and the expense, availability, and environmental issues relating to the fuel. Possible fuels include conventional fuels such as hydrocarbon fuels, including, but not limited to, conventional liquid fuels, such as gasoline, diesel, ethanol, methanol, kerosene, and others; conventional gaseous fuels, such as natural gas, propane, butane, and others; and alternative or "new" fuels, such as hydrogen, biofuels, Fischer Tropsch dimethyl ether, and others; and combinations thereof The preferred fuel is typically based upon the type of engine employed, with lighter fuels, i.e. those which can be more readily vaporized and/or conventional fuels which are readily available to consumers, generally preferred.

The other major component beside the SOFC which is typically employed by the system of the present invention to produce tractive power for a vehicle is the engine. Within the engine, SOFC effluent, air, and/or fuel are burned to produce energy, while the remainder of unburned fuel and reformed fuel is used as fuel in the SOFC. The engine can be any conventional combustion engine including, but not limited to, internal combustion engines such as spark ignited and compression ignited engines, including, but not limited to, variable compression engines.

Similar to the engine, the turbine can be employed to recover energy from the engine effluent to produce tractive power and further to recover energy to operate the compressor(s) and preferably to generate electricity for various uses throughout the system and/or vehicle. The turbine employed can be any conventional turbine useful in automotive or power generation applications. In a preferred embodiment, the turbine and/or compressor may be accelerated or decelerated by a motor/generator to increase the compression (when required to increase the compression for optimal system performance) or to decrease compression (when excessive energy is available in the exhaust gases). For example, a high speed electrical machine can be linked to the turbine and compressor.

After passing through the turbine, the SOFC effluent preferably enters a catalytic converter in order to attain extremely low, nearly zero emissions of hydrocarbons and nitric oxide. The catalytic converter is typical of those used in automotive applications, including those employing (1) noble metals and alloys thereof, such as platinum, rhodium and palladium catalysts and alloys thereof, among others and/or (2) particulate filtering and destruction.

Optional equipment which additionally may be employed with the present system includes, but is not limited to, sensors and actuators, heat exchangers, a battery, fuel reformer, burner, phase change material, thermal storage system, plasmatron, a desulfurizer, or combination thereof Where the desulfurizer may be employed if the fuel is rich in sulfur, or if the catalyst employed in the SOFC is particularly intolerant to sulfur, such as nickel-based catalysts, among other conventional equipment. In contrast to conventional vehicles and even to prior art systems which employ fuel cells, the system of the present invention does not require the use of a battery. Although a small battery may be employed as a sort of back-up system, it is not necessary. The engine may act as a peaking device for high power modes (analogous to a battery).

The various embodiments of the present invention provide advantages over the prior art in that they: (1) provide electrical power that is "cheaper" than shaft power (in terms of fuel consumption); (2) reduce or eliminate the need for batteries (the SOFC can operate with the engine off to supply electric accessories and modest tractive power; (3) provide an efficiency benefit since conventional fuel reformers consume electricity, and the SOFC of the present invention may perform the reforming function and an emission destruction, while producing electricity; (4) nearly zero emissions due to the ability to combust extremely dilute mixtures on the cold start and to consume unburned and partially burned fuel which is always produced in combustion (especially rich combustion), e.g. intended to meet or exceed SULEV standards of 0.010 gallons per mile (g/mi) hydrocarbons, 1.0 g/mi carbon monoxide, 0.02 g/mi nitric oxide, and 0.01 g/mi particulate; (5) increase overall system efficiency, up to or exceeding about 60% at light load and about 45% at heavy load; and (6) are compatible with advanced combustion systems such as homogeneous charge compression ignition—a "clean" diesel technology where premixed fuel is ignited by compression pressure and temperature; and (7) allow combustion of fuels with extremely low particulate emissions by trapping and consuming particulate in the SOFC and catalytic converter.

The embodiments of the present system and method, although mostly described in relation to utilization within a vehicle, can be utilized in numerous applications, including, but not limited to: cogeneration of heat and electric power, distributed electric power generation, such as small scale power plants for commercial/industrial/marine applications, and portable power generation, such as military/construction/recreational applications, among others.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A power generation system, comprising:
    an engine, having an intake and an exhaust;
    an air supply in fluid communication with said engine intake;
    a fuel supply in fluid communication with said engine intake; and
    at least one SOFC, having an air intake in fluid communication with said air supply, a fuel side intake, a SOFC effluent and an air effluent, said SOFC fuel side intake in fluid communication with said engine exhaust.

2. The power generation system as in claim 1, further comprising a turbine in fluid communication with said SOFC effluent.

3. The power generation system as in claim 2, wherein said turbine is further in fluid communication with said air effluent.

4. The power generation system as in claim 1, wherein said SOFC fuel intake is further in fluid communication with said fuel supply.

5. The power generation system as in claim 4, wherein said SOFC fuel intake is further in fluid communication with said air supply.

6. The power generation system as in claim 1, further comprising at least one compressor in fluid communication with said air supply and said SOFC.

7. The power generation system as in claim 1, further comprising a preheating device in fluid communication with said fuel supply and said SOFC fuel side intake.

8. The power generation system as in claim 7, wherein said preheating device is a burner, a heat exchanger, a plasmatron, a vaporizor, a fuel reformer, or a combination thereof.

9. The power generation system as in claim 1, further comprising a catalytic converter having an inlet, wherein said inlet is in fluid communication with said SOFC effluent.

10. The power generation system as in claim 1, further comprising at least one heat exchanger in fluid communication with said air supply and said SOFC air supply intake.

11. The power generation system as in claim 1, further comprising:
    an alternate feel supply, said SOFC fuel side intake in fluid communication with said engine exhaust, said alternate fuel supply, or a combination thereof;
    wherein said SOFC is operated independently of said engine to supply tractive power, operate vehicle accessories, or a combination thereof.

12. The power generation system as in claim 11, wherein said SOFC is operated independently of said engine to supply all of a vehicle's tractive power.

13. A method for operating a power generation system, comprising:
    supplying at least a first portion of fuel and a first portion of air to an engine;
    reacting said first portion of fuel and said first portion of air in said engine to produce an engine effluent;
    introducing said engine effluent to a fuel intake of a SOFC;
    introducing a second portion of air to an air intake of said SOFC; and
    ionizing oxygen in the second portion of air such that the ionized oxygen migrates to the fuel side of the SOFC where it reacts with said engine effluent to produce an SOFC effluent.

14. The method for operating a power generation system as in claim 13, further comprising directing said SOFC effluent through a catalytic converter having a converter exhaust.

15. The method for operating a power generation system as in claim 14, wherein said converter exhaust comprises negligible quantities of hydrocarbons, nitric oxide, carbon monoxide and particulates.

16. The method for operating a power generation system as in claim 13, further comprising using said SOFC effluent to heat said second portion of air prior to introduction into said air intake.

17. The method for operating a power generation system as in claim 13, further comprising introducing a second portion of fuel to the fuel intake.

18. The method for operating a power generation system as in claim 13, further comprising introducing said SOFC effluent to a turbine.

19. The method for operating a power generation system as in claim 13, further comprising compressing said first portion of air and said second portion of air.

20. The method for operating a power generation system as in claim 13, wherein said SOFC effluent comprises negligible quantities of hydrocarbons, nitric oxide, carbon monoxide and particulates.

21. The method for operating a power generator as in claim 13, further comprising supplying a portion of said second portion of air to said fuel intake, and applying a reverse current to said SOFC to separate oxygen from said portion of said second portion of air.

22. The method for operating a power generator as in claim 13, comprising introducing at least a portion of said SOFC effluent to said engine.

23. The method for operating a power generator as in claim 13, wherein said second portion of air introduced to said SOFC produces an oxygen-depleted air stream, and further comprising introducing said SOFC air stream to said engine.

24. The method for operating a power generation system as in claim 13, further comprising:

using said SOFC to supply tractive power, operate vehicle accessories, or a combination thereof.

25. The method for operating a power generation system as in claim 24, further comprising using said SOFC to supply all of a vehicle's tractive power.

* * * * *